United States Patent [19]
Bennett et al.

[11] Patent Number: 5,764,769
[45] Date of Patent: Jun. 9, 1998

[54] DIGITAL RECORDING SYSTEM WITH TIME-BRACKETED AUTHENTICATION BY ON-LINE CHALLENGES AND METHOD OF AUTHENTICATING RECORDINGS

[75] Inventors: Charles Henry Bennett, Croton-on-Hudson; David Peter DiVincenzo, Chappaqua; Ralph Linsker, Millwood, all of N.Y.

[73] Assignee: International Business Machines Corporation, Armonk, N.Y.

[21] Appl. No.: 690,706

[22] Filed: Jul. 31, 1996

[51] Int. Cl.⁶ .................................................. H04N 7/167
[52] U.S. Cl. .................................................. 380/23; 380/10
[58] Field of Search .................................. 380/10, 20, 23, 380/5

[56] References Cited

U.S. PATENT DOCUMENTS

| | | |
|---|---|---|
| 4,922,339 | 5/1990 | Stout et al. . |
| 5,027,395 | 6/1991 | Anderson et al. . |
| 5,048,086 | 9/1991 | Bianco et al. . |
| 5,136,646 | 8/1992 | Haber et al. . |
| 5,136,647 | 8/1992 | Haber et al. . |
| 5,175,765 | 12/1992 | Perlman . |
| 5,321,396 | 6/1994 | Lamming et al. . |
| 5,351,302 | 9/1994 | Leighton et al. . |
| 5,422,953 | 6/1995 | Fischer . |
| 5,499,294 | 3/1996 | Friedman ........................... 380/10 |

*Primary Examiner*—David C. Cain
*Attorney, Agent, or Firm*—Whitham, Curtis & Whitham; Stephen S. Strunck

[57] ABSTRACT

An apparatus and method produce a videotape or other recording that cannot be pre- or post-dated, nor altered, nor easily fabricated by electronically combining pre-recorded material. In order to prevent such falsification, the camera or other recording apparatus periodically receives certifiably unpredictable signals ("challenges") from a trusted source, causes these signals to influence the scene being recorded, then periodically forwards a digest of the ongoing digital recording to a trusted repository. The unpredictable challenges prevent pre-dating of the recording before the time of the challenge, while the storage of a digest prevents post-dating of the recording after the time the digest was received by the repository. Meanwhile, the interaction of the challenge with the evidence being recorded presents a formidable obstacle to real-time falsification of the scene or system, forcing the would-be falsifier to simulate or render the effects of this interaction in the brief time interval between arrival of the challenge and archiving of the digest at the repository.

32 Claims, 3 Drawing Sheets

DIGITAL RECORDING SYSTEM WITH TIME-BRACKETED AUTHENTICATION BY ON-LINE CHALLENGES AND METHOD OF AUTHENTICATING RECORDINGS

BACKGROUND OF THE INVENTION

1. Field of the Invention

The present invention generally relates to the authentication of recorded evidence and, more particularly, to an interactive recording apparatus and method that periodically receives unpredictable signals ("challenges") from a trusted source, which signals influence the evidence being recorded, then promptly sends to a trusted repository a hashed digest of the ongoing digitized recorded evidence.

2. Background Description

Recorded evidence, such as videotapes of crime scenes, police interviews, and actions performed in fulfillment of a contract, statute, ordinance or treaty, are ordinarily authenticated by the testimony of witnesses present when the recording was made, supplemented by an unbroken chain of custody between the time the recording was made and the time it is used in evidence. If the chain of custody were broken, for example if the recording were borrowed for a few days by an unscrupulous person, modern digital signal manipulation techniques would make it possible to falsify the evidence, for example by altering an internal time stamp or by adding or removing scenes, objects, sounds, data or the like.

The prior art has variously addressed this problem by a technique known as time stamping. For example, U.S. Pat. No. Re. 34,954 to Haber et al. discloses a time-stamping technique in which a digital document is hashed using a one-way hash function to form a hash digest. The digest (a binary number) is sent to a trusted certification agency, which assigns a time stamp and uses a public key cryptosystem to encrypt the combination of the digest and time stamp. By decrypting this combination at a later time, using the agency's public key, it is provable that the agency in fact combined the hash digest with the time stamp. Since the agency is trusted, it is inferred that the hash digest was submitted to the agency at the time corresponding to the time stamp. By the nature of one way hash functions, no other document can plausibly have the same hash digest value.

The Haber et al. method authenticates the fact that a given digital document was submitted to the agency at a claimed time. It says nothing about the relationship between the document and a set of circumstances in the physical world that the document may purport to faithfully represent. For example, a scene could be staged and videotaped at time A, authenticated with a later time stamp B, and falsely claimed to be a representation of events that occurred at any desired time prior to time B. Alternatively, the videotape could be assembled from portions made at different times (all prior to time B). Thus, the Haber et al. method provides no way to bracket the time of creation of the video; only a latest time of creation (i.e., time B) is authenticated.

The importance of knowing that a certain event did not take place before its purported time is illustrated by a form of insurance fraud. A motorist involved in an accident in which he was not at fault might take a picture of his damaged car and send it to his insurance company, concealing the fact that most of the damage occurred in an earlier, unreported accident in which he was at fault.

Another approach to authenticating recordings is disclosed in U.S. Pat. No. 4,922,339 to Stout et al. which describes a system for visual surveillance and documentation which comprises one or more cameras to visually record an event and a transducer that derives (non-visual) information about the event. The visual signal and the information signal are integrated to form a third signal that is recorded or displayed. This is asserted to be done in such a way that neither the visual nor the information portion can be altered independently of the other portion. An example shows a truck being weighed and the weight measurement being combined with a visual image of the truck. Time stamping is optional.

While Stout et al. claim to provide an unalterable record linking a video image to some measured information about the physical world, possibly including a time stamp, they provide no means of ensuring unalterability. Stout et al. rely on the combining of two signals to form one signal using a commercially available device but do not consider the possibility that the combined signal could be decomposed and a new combined signal reconstructed in which one of the components has been altered. Even if a time stamp is used, no authentication of the time stamp is provided by Stout et al. Time stamp authentication is of course known in the art as evidenced by Haber et al., supra, but even if applied to the Stout et al. system, such authentication only provides a latest time at which the recording could have been made.

SUMMARY OF THE INVENTION

It is therefore an object of the present invention to provide an apparatus that produces a recording, such as a videotape, an audio recording, a log or the like, that cannot be pre- or post-dated, nor altered, nor easily fabricated by electronically combining pre-recorded material.

According to the present invention, in order to prevent such falsification, the recording apparatus, such as a camera or other recording device, periodically receives certifiably unpredictable signals ("challenges") from a trusted source, causes these signals to influence the evidence being recorded, then periodically forwards a digest of the ongoing digital recording to a trusted repository. The unpredictable challenges prevent pre-dating of the recorded evidence before the time of the challenge, while the storage of a digest prevents post-dating of the recorded evidence after the time the digest was received by the repository. Meanwhile, the interaction of the challenge with the evidence being recorded presents a formidable obstacle to real-time falsification of the recorded evidence, forcing the would-be falsifier to simulate or render the effects of this interaction in the brief time interval between arrival of the challenge and archiving of the digest at the repository.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF PREFERRED EMBODIMENTS OF THE INVENTION

Figure 1:
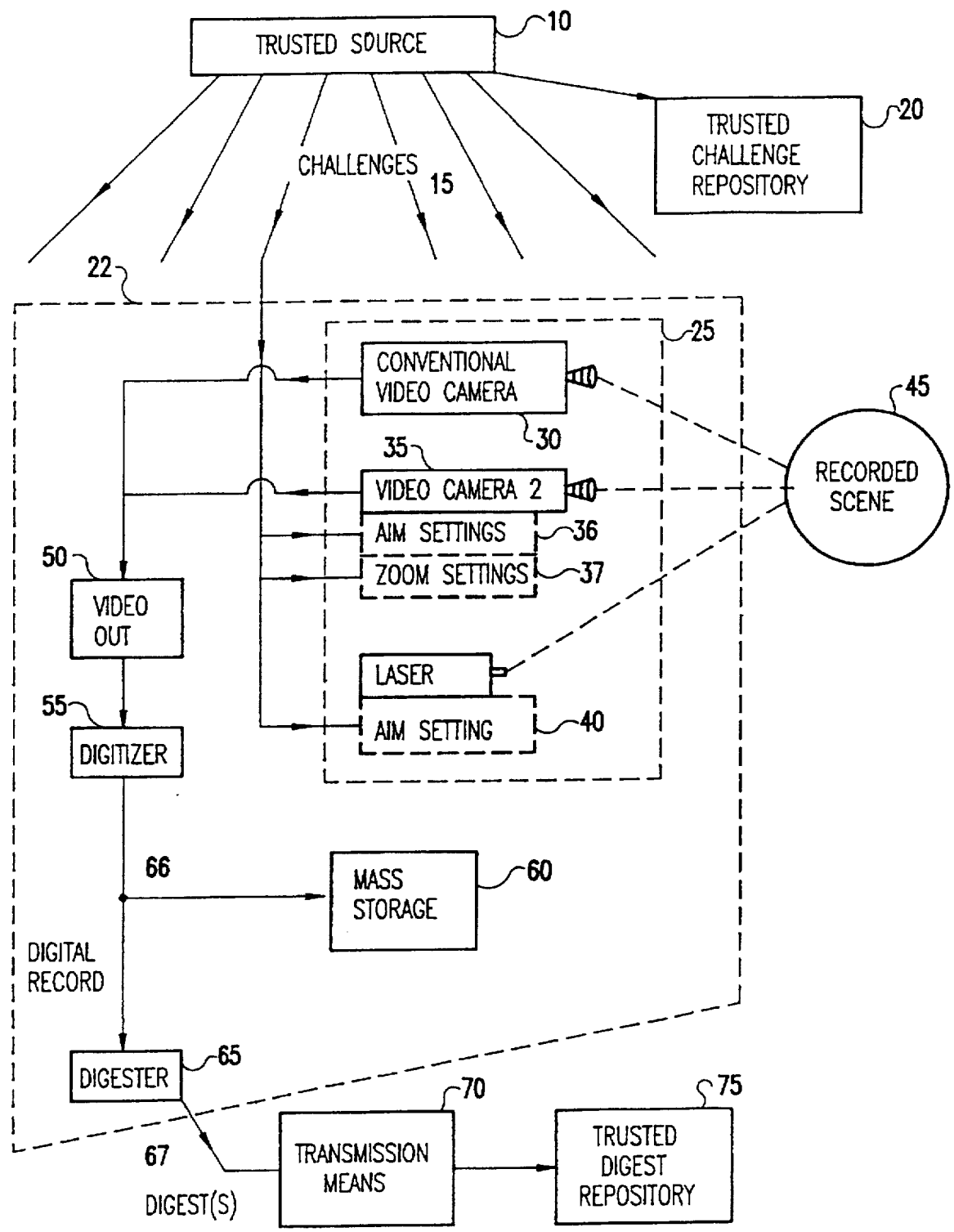
FIG. 1 is a block diagram showing the interactive recording apparatus according to a preferred embodiment of the invention.

Referring now to the drawings, and more particularly to FIG. 1, there is shown in block diagram form the interactive recording apparatus according to a preferred embodiment of the invention. A trusted source 10 periodically emits unpredictable digital signals or "challenges" to one or more receivers, two such receivers being shown in the example illustrated in the figure. In the preferred embodiment, the challenges are generated by a physical random process, an example of one such random process being electrical noise from a back-biased diode near breakdown. By standard digital sampling techniques, such processes can be used to generate a bit sequence each of whose bits is, in principle, almost perfectly unpredictable, even given a complete knowledge of the design of the generator, its initial digital state, and its past output. Trusted source 10 may include transmission means such as a radio transmitter, telephone-and-modem, or computer network.

Among the receivers is a trusted challenge repository 20 of past transmitted signals and their times of emission and one or more authenticating video camera assemblies 25. Trusted challenge repository 20 may be combined with trusted source 10 or with a trusted digest repository 75, described in more detail hereinbelow, or all three functions may be combined in one location. For example, the trusted challenge repository 20 need not be a "receiver" (in the transmitter/receiver sense); it could be integral with the trusted source 10.

The interactive digital recording apparatus (IDRA), comprising those elements of FIG. 1 enclosed within the dotted line 22, receives challenges 15 from the trusted source 10 and produces a digital record 66 and digest(s) 67 of the recorded scene 45, these digests being transmitted to trusted digest repository 75. In a preferred embodiment, the IDRA consists of a video camera assembly 25, a video output 50, a digitizer 55, a mass storage medium 60, and a digester 65.

The authenticating video camera assembly 25 comprises a conventional video camera 30, with conventional aiming, zoom and focus, an auxiliary camera 35 whose aim 36 and zoom 37 settings, relative to those of the main camera, are controlled by the challenges, and an infrared laser 40 emitting a well collimated beam whose aim and intensity are controlled by the challenges. For example a 64-bit challenge, received once a second, could be split into two 32-bit words. The first word could be used to specify a choice among $2^{32}$ possible scan patterns for the laser 40 (each of which scan patterns should visit most parts of the scene several times during the one second interval since the last challenge). The second word would provide a choice among $2^{32}$ possible aimings and zooms of the auxiliary camera 35 relative to the main camera 30.

The unpredictable scan pattern of the laser 40 would require a would-be falsifier to expend large computing resources in an attempt to render by computer graphics the effect that the laser light would have produced on a prerecorded scene. The unpredictable zoom would require the would-be falsifier to maintain a large database of realistic and verifiable information about the details of every part of the recorded scene.

The assembly 25 captures a video recording of the scene 45 to be authenticated, with the alterations and manipulations described above. The video signal 50 leaving the assembly is digitized by a digitizer 55 of conventional design after which the digitized signal is stored on a mass storage medium 60, such as magnetic tape, disk or the like, for subsequent retrieval. The output of the digitizer 55 is also fed to a digester 65 which periodically prepares digests of the current and/or cumulative digital signal 66, using a secure hash function. The exact form of the hash function is announced or agreed upon publicly in advance, by publication in a newspaper or dissemination to a plurality of sites on a computer network. If a secure hash function mapping 512 bits to 256 bits is used, a digest of one second of action can be computed by breaking the digitized video signal into 256-bit blocks $B_1, B_2, \ldots, B_n$ and computing a digest $D_n$ by the following iteration:

$$D_0 = 0$$
$$D_1 = h(B_1, D_0)$$
$$D_2 = h(B_2, D_1)$$
$$\cdot$$
$$\cdot$$
$$D_n = h(B_n, D_{n-1})$$

At the end of each second, the current digest $D_n$, which depends on the entire past second of video recording, including the effect of the challenges, is transmitted by transmission means 70 to the trusted digest repository 75, where it is stored with its time of receipt and other identifying information.

Figure 2:
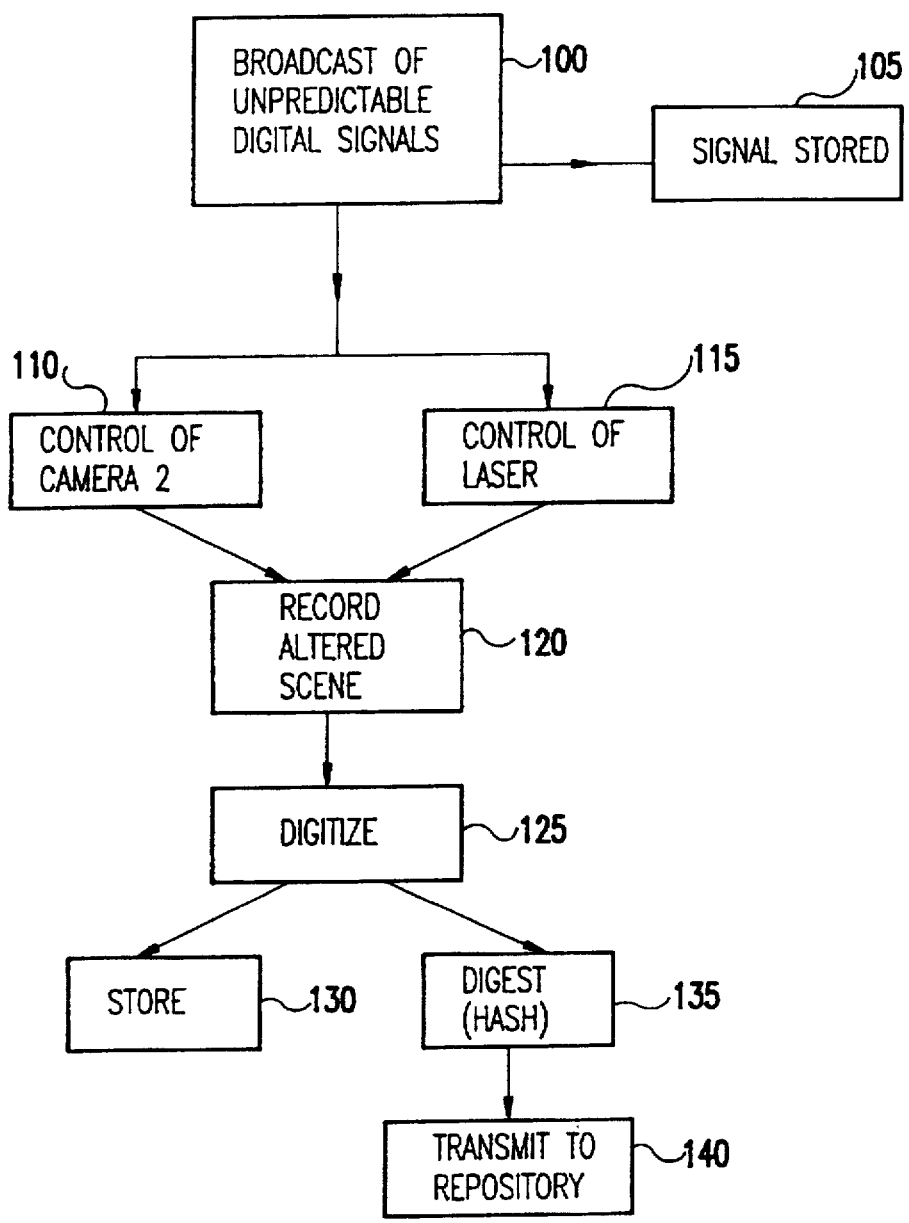
FIG. 2 is a flow diagram showing the operation of the apparatus of FIG. 1.

The process is summarized in the flow diagram of FIG. 2. Periodically, unpredictable digital signals (i.e., the challenges) are broadcast by trusted source 10, as indicated by function block 100. These signals are received by trusted challenge repository 20 which stores the signals at function block 105. The signals are also received by the video camera assembly 25 where they are used to control the camera 35 at function block 110 and to control the laser 40 at function block 115. The result is a record of the altered scene in function block 120 that is digitized in function block 125. The digitized signal is stored in mass storage medium 60 at function block 130 and it is also digested by digester 65 using a hashing function at function block 135. The digest is then transmitted to trusted digest repository 75 at function block 140.

Thus, the interactive recording apparatus according to the invention brackets the time a recording is made and when it is authenticated. By making the bracketed period small (e.g., one second), it is difficult or impossible for a would-be fabricator to simulate the recorded effects of the challenges in real time.

Figure 3:
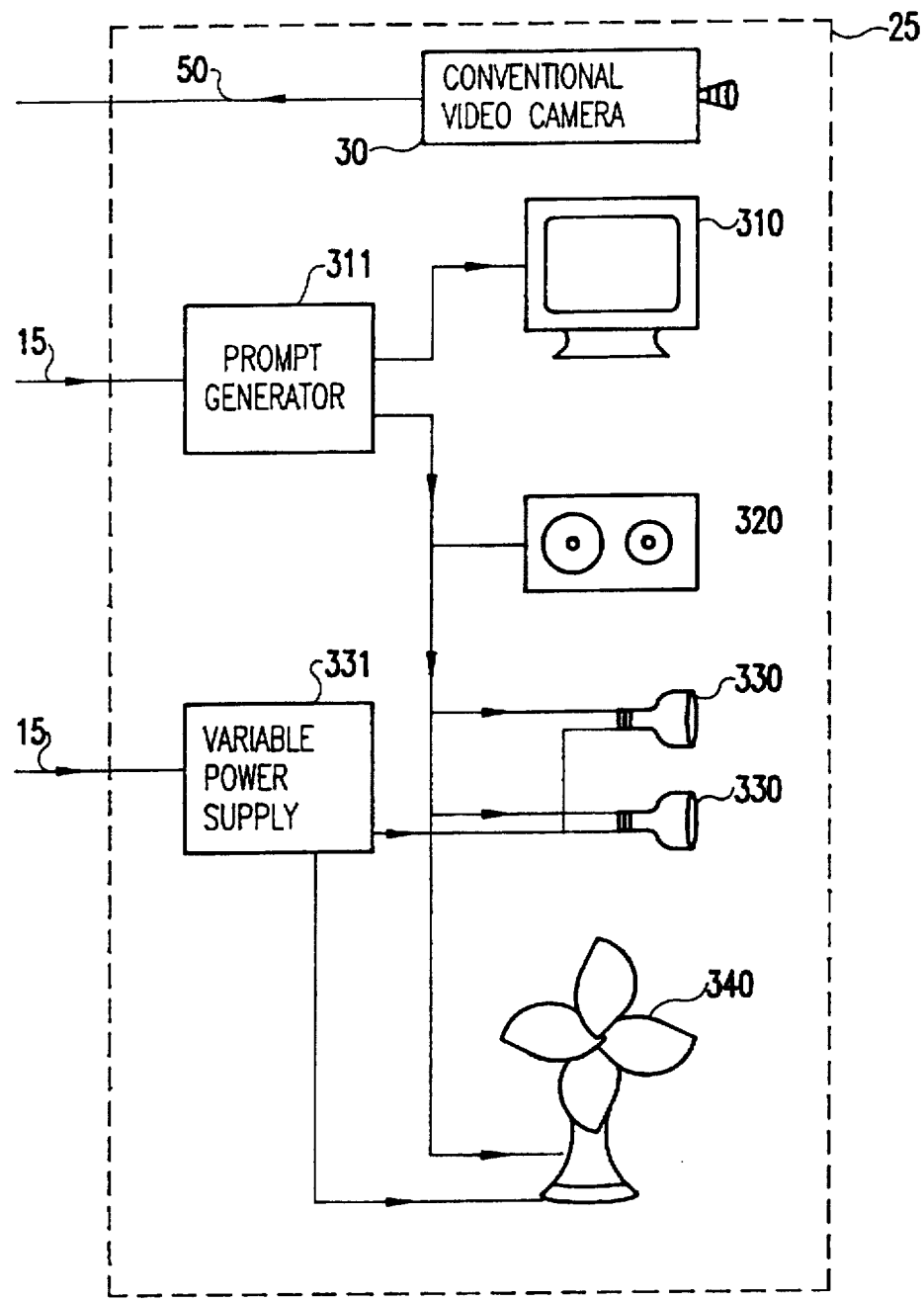
FIG. 3 is a block diagram showing alternative implementations of a portion of the interactive recording apparatus of FIG. 1.

In some cases, the evidence to be recorded and time bracketed is a scene of a person or persons in a small enclosed space (e.g., a studio) with a cooperative or not completely uncooperative subject. In such cases, the video camera assembly 25 may be augmented by a suite of additional equipment, as shown in FIG. 3. This equipment may be used to influence or alter the scene to authenticate the recorded evidence. For example, a video monitor 310 may display unpredictable instructions to the subject, such as to speak a certain word or perform a specified action (e.g., raise your right hand). These actions are selected from a database in response to the challenge signal 15 by a prompt generator 311, which is a simple application of known personal computer art. The acoustic speaker 320 can issue the same prompts as monitor 310. Alternatively, it can issue short, loud audio bursts which will involuntarily startle the subject in a way which is detectable in the recorded evidence. Acoustic speaker 320 may be driven by the same prompt generator 311.

Also, there may be lights 330, which may be used to provide gradual variations of the illumination of the scene, and also bright bursts of light that evoke a recordable startle reflex in the subject. The lights may be controlled both by the prompt generator 311 and by a variable power supply 331. Power supply 331 is also controlled by the unpredictable challenge 15. An ordinary fan 340 may, through variations in its speed, disturb the clothing and hair of the subject, or other moveable portion of the scene, in a recordable way. Again, fan 340 may be controlled both by the prompt generator 311 and the variable power supply 331.

For the prompt generator 311 and variable power supply 331, as with the video camera 35 and laser 40 shown in FIG. 1, the mapping between the inputted unpredictable challenges and the physical actions produced by the challenges is announced or agreed upon publicly in advance, by publication in a newspaper or dissemination to a plurality of sites on a computer network. The mapping should be simple enough that any ordinary person can perceive that a random input signal results in a random challenge. For example, a rule such as "if five consecutive ones are inputted, increase the fan speed; but if five consecutive zeros are inputted, decrease the fan speed" may be used.

While video recordings have been described, those skilled in the art will recognize that teachings of the invention apply to audio recordings, which are similarly susceptible to manipulation of their content if not properly authenticated. Instead of laser scans, the challenges would cause loud clicks or other sounds to be emitted from a phased array of loudspeakers, producing a challenge-dependent echo from the room or other environment in which the recording was taking place. Instead of zooming and aiming an auxiliary camera, the challenges could specify movements of the microphone or microphones making the recording. If the recording involved a cooperative subject, the challenges might, as in the video embodiment with a cooperative subject, prompt the subject to say specified words or phrases, or make other specified sounds.

Because of their lesser bandwidth, audio recordings can generally be manipulated and falsified more quickly than video recordings; therefore, it is advisable to increase the bandwidth of the audio recording by using several microphones rather than just one, and by transducing and digitizing the audio signals with an amplitude and time resolution much greater than that needed for a subjectively faithful audio recording. The resulting recording would then contain inaudible but reproducible information about the spatiotemporal response of the room or other environment to the sound sources being recorded, and to the extra sounds induced by the challenges.

To further impede real time falsification, the time window between transmission of challenges and the archiving of the first subsequent digest should be made smaller than would be needed in a video embodiment; e.g., a few milliseconds rather than a few seconds. This can be done even when some of the responses, e.g., spoken responses from a cooperative subject, occur on a longer time scale. In that case, the response to a single challenge would affect the next several seconds worth of archived digests.

Another application of the invention is the authentication of real time logs of engineering or process data generated, for example, by a chemical factory. Process logs, like unauthenticated video recordings, can be manipulated to falsify, pre-date, or post-date the sequence of events purportedly taking place, and they are commonly impounded immediately after any serious accident. Time bracketed authentication of a process log can be obtained by an apparatus that, in response to on-line challenges, randomly modulates the process' control parameters, within ranges small enough not to significantly degrade process safety or product quality. Other parameters, not normally used to control the process, can also be modulated in order to produce a more complex, hard-to-simulate response. For the same reason, the normal process log is augmented by gathering sufficient other information, besides the output variables normally monitored for process control purposes, to make the augmented input/output relation for an actual process hard to simulate in real time.

The audio and process control embodiments exemplify the principle that a low resolution record (e.g., a low bandwidth monophonic audio recording or a low resolution process control log), which might in its original form be simulated and falsified in real time, can nevertheless be protected by embedding it in a higher resolution view of the same real world events, involving higher bandwidth, more input and output parameters, related by a more complex dynamics.

Although the preferred embodiments incorporate a physical process that is unpredictable in principle, to generate the challenges, other processes having an unpredictable component could be employed instead. Stock and commodity trading generate publicly verifiable statistics (e.g., whether an even or an odd number of trades take place during a given minute) in practice are beyond any individual's ability to control completely; hence, they could be used to provide random challenges. Even a deterministic process, such as a cryptographically strong pseudorandom generator with a secret seed, could be used to generate challenges. Such a process could be used if the process was in practice unpredictable by the user population, but in the case of a pseudorandom generator, the seed would constitute insider information which the source must be trusted to keep secret.

In any of the embodiments described, it may be impractical for one reason or another for the recording apparatus to maintain continuous online, two-way communication to a remote trusted challenge source and a remote trusted digest repository. Either or both of these functions may be performed locally by a module within the recording apparatus intended to perform the duties of a trusted source or repository. Such an implementation might be used in situations where the on-line connection is not always available. Any locally performed trusted functions (source and/or repository) should be protected from fraudulent intervention by being enclosed in a tamper-resistant module (TRM) that may be of conventional design; e.g., a wire-embedded epoxy package in which intrusion is sensed by a change of the electrical resistance of the wire. To assist in preventing pre- and post-dating during off-line operation, the TRM could include a secure clock which cannot easily be reset from the outside. In any case, it is advisable to back up the challenges and digests produced during off-line operation into a trusted repository when communication to the repository again becomes available.

A further alternative embodiment, which may be used if the bandwidth of the digital record 66 does not exceed the capacity of the transmission means 70, dispenses with the mass storage medium 60, digester 65, and digests 67. In this alternative embodiment, the digital record 66, without being digested, is sent through transmission means 70 to the trusted repository 75, and archived there. Like the preferred embodiment, this embodiment involves the archiving at a trusted repository of some information depending on the digital record 66, which information serves to authenticate the event 45 being recorded. In this embodiment, the archived information is the digital record 66 itself, while in the preferred embodiment it is a sequence of digest(s) 67 of the digital record 66. Such digests do not in themselves authenticate the event 45, but instead serve to do so in conjunction with the digital record 66 of that event, thereby allowing the digital record to be safely stored in an untrusted location, such as the mass storage medium 60 associated with the recording apparatus.

While the invention has been described in terms of several preferred embodiments, those skilled in the art will recognize that the invention can be practiced with modification within the spirit and scope of the appended claims.

Having thus described our invention, what we claim as new and desire to secure by Letters Patent is as follows:

1. An interactive recording apparatus with time-bracketed authentication by on-line challenges comprising:
   a receiver responsive to periodically transmitted unpredictable challenges to influence evidence being recorded in such a way as to produce a recordable effect;
   a recorder recording said evidence including the recordable effect and generating a digital recorded signal; and
   a transmitter at said receiver for transmitting authenticating information derived from said digital recorded signal to a trusted repository for storage, the time of storage of the challenges at the trusted challenge repository and the time of storage of the authenticating information at the trusted repository establishing a time bracket that is sufficiently short as to make it difficult or impossible for a would-be fabricator to simulate the recorded effects of the challenges in real-time.

2. The recording apparatus as recited in claim 1 wherein said authenticating information comprises said digital recorded signal.

3. The recording apparatus as recited in claim 1 further comprising:
   a mass storage for storing said digital recorded signal; and
   a digester receiving the digital recorded signal and generating one or more digital digests of the digital recorded signal, wherein said authenticating information comprises said one or more digital digests.

4. The recording apparatus as recited in claim 1 further comprising mass storage for storing the digital recorded signal.

5. The recording apparatus as recited in claim 1 wherein said recorder comprises a video camera for recording evidence.

6. The recording apparatus as recited in claim 5 wherein said recorder further comprises an auxiliary camera having aim and zoom settings, relative to those of the video camera, that are controlled by challenges received by said receiver.

7. The recording apparatus as recited in claim 5 wherein said recorder further comprises a laser emitting a well collimated beam whose aim and intensity are controlled by challenges received by said receiver, said laser producing an effect in the recorded evidence.

8. The recording apparatus as recited in claim 5 wherein said recorder further comprises:
   an auxiliary camera having aim and zoom settings, relative to those of the video camera, that are controlled by challenges received by said receiver; and
   a laser emitting a well collimated beam whose aim and intensity are controlled by challenges received by said receiver, said laser producing an effect in the recorded evidence.

9. The recording apparatus as recited in claim 5 wherein said recorder further comprises:
   a prompt generator controlled by challenges received by said receiver; and
   means controlled by said prompt generator for issuing a prompt to a subject for an action by the subject.

10. The recording apparatus as recited in claim 9 wherein the prompt issued to the subject is a video prompt.

11. The recording apparatus as recited in claim 9 wherein the prompt issued to the subject is an audio prompt.

12. The recording apparatus as recited in claim 5 wherein said recorder further comprises:
    a prompt generator controlled by challenges received by said receiver; and
    means controlled by said prompt generator for generating a sensory signal to a subject causing an involuntary reaction by the subject.

13. The recording apparatus as recited in claim 12 wherein the sensory signal to the subject is a visual signal.

14. The recording apparatus as recited in claim 12 wherein the sensory signal to the subject is an audio signal.

15. The recording apparatus as recited in claim 1 wherein the recorder is an digital audio recorder.

16. The recording apparatus as recited in claim 1 further comprising:
    a trusted transmitter for periodically transmitting the unpredictable challenges; and
    a trusted challenge repository for receiving and storing the transmitted challenges and their times of transmission.

17. The recording apparatus as recited in claim 16 wherein challenges transmitted by said trusted transmitter are generated by a physical random process.

18. The recording apparatus as recited in claim 16 wherein challenges transmitted by said trusted transmitter are generated from publicly verifiable data which are not completely predictable.

19. The recording apparatus as recited in claim 16 wherein challenges transmitted by said trusted transmitter are generated by a secret process which is incompletely predictable without using information unavailable to a user population.

20. The recording apparatus as recited in claim 19 wherein the process is a pseudorandom process.

21. The recording apparatus recited in claim 16 wherein the trusted challenge repository is combined with the trusted transmitter.

22. A time-bracketing authentication system comprising:
    a trusted source of incompletely predictable challenges;
    a trusted challenge repository for archiving and assuring time of receipt of said challenges;
    an interactive digital recording apparatus responsive to the challenges to influence recording of evidence as it is being recorded in such a way as to produce a digital record of said evidence, including recorded effects of the challenges; and
    a trusted repository for archiving and assuring time of receipt of authenticating information derived from said digital record.

23. The time-bracketing authentication system of claim 22 further comprising a digester receiving said digital record and generating one or more digests, which digests are the authenticating information.

24. The time-bracketing authentication system of claim 23 further comprising mass storage for storing the digital record.

25. The time-bracketing authentication system of claim 22 wherein a time interval between issuance of at least one of said challenges and a receipt by said trusted repository of a digital record influenced by said challenge is sufficiently short to render the fabrication or simulation of the recorded effect infeasible.

26. The time-bracketing authentication system of claim 22 wherein the digital recording apparatus includes a video camera.

27. The time-bracketing authentication system of claim 22 wherein the digital recording apparatus includes an audio recorder.

28. The time-bracketing authentication system of claim 22 wherein a resolution of the recorded data is increased relative to those in a conventional digital recording in order to make an augmented recording with a response to challenges that is harder to falsify in real-time.

29. The time-bracketing authentication system of claim 22 wherein the evidence being recorded is a log of data from a process.

30. An interactive digital recording method comprising the steps of:

receiving transmitted unpredictable challenges and influencing evidence being recorded in such a way as to produce a recordable effect;

recording said evidence including the recordable effect and generating a digital recorded signal; and transmitting authenticating information derived from said digital recorded signal to a trusted repository for storage, the time of storage of the challenges at the trusted challenge repository and the time of storage of the authenticating information at the trusted repository establishing a time bracket that is sufficiently short as to make it difficult or impossible for a would-be fabricator to simulate the recorded effects of the challenges in real-time.

31. The interactive digital recording method recited in claim 30 further comprising the step of receiving the recorded signal and generating a digital digest of recorded signal, the digital digest being the authenticating information transmitted to said trusted repository in said step of transmitting.

32. The interactive digital recording method recited in claim 30 further comprising the steps of:

periodically transmitting the unpredictable challenges from a trusted transmitter; and receiving and storing the transmitted challenges and their times of transmission at a trusted challenge repository.

* * * * *